T860,001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 677

603,791

CHEMICALLY MODIFIED CARBON BLACK AND RUBBERY COMPOSITIONS CONTAINING SAME

Albert M. Gessler, 448 Orchard St., Cranford, N.J. 07016, and John Rehner, Jr., 200 Linden Ave., Westfield, N.J. 07090

Continuation-in-part of application Ser. No. 359,454, Apr. 13, 1964, which is a continuation of application Ser. No. 20,842, Apr. 8, 1960, which is a continuation-in-part of application Ser. No. 684,643, Sept. 18, 1957. This application Dec. 22, 1966. Published Mar. 18, 1969

Class 260—41.5

No Drawing. 47 Pages Specification

Carbon blacks, whose surface areas have been increased at least 25% above normal values, when chemically modified through contact with a substance such as elemental halogen, sulfur-containing compounds, nitrogen-containing compounds, oxygen-containing compounds, halogen-containing compounds and mixtures thereof are highly desirable fillers for rubbery materials particularly synthetic rubbery materials such as butyl rubber. The preferred method of attrition is steel ball milling.